Jan. 27, 1931.  W. H. HARVEY  1,790,542
CORE DRILL
Filed March 6, 1929   2 Sheets-Sheet 1
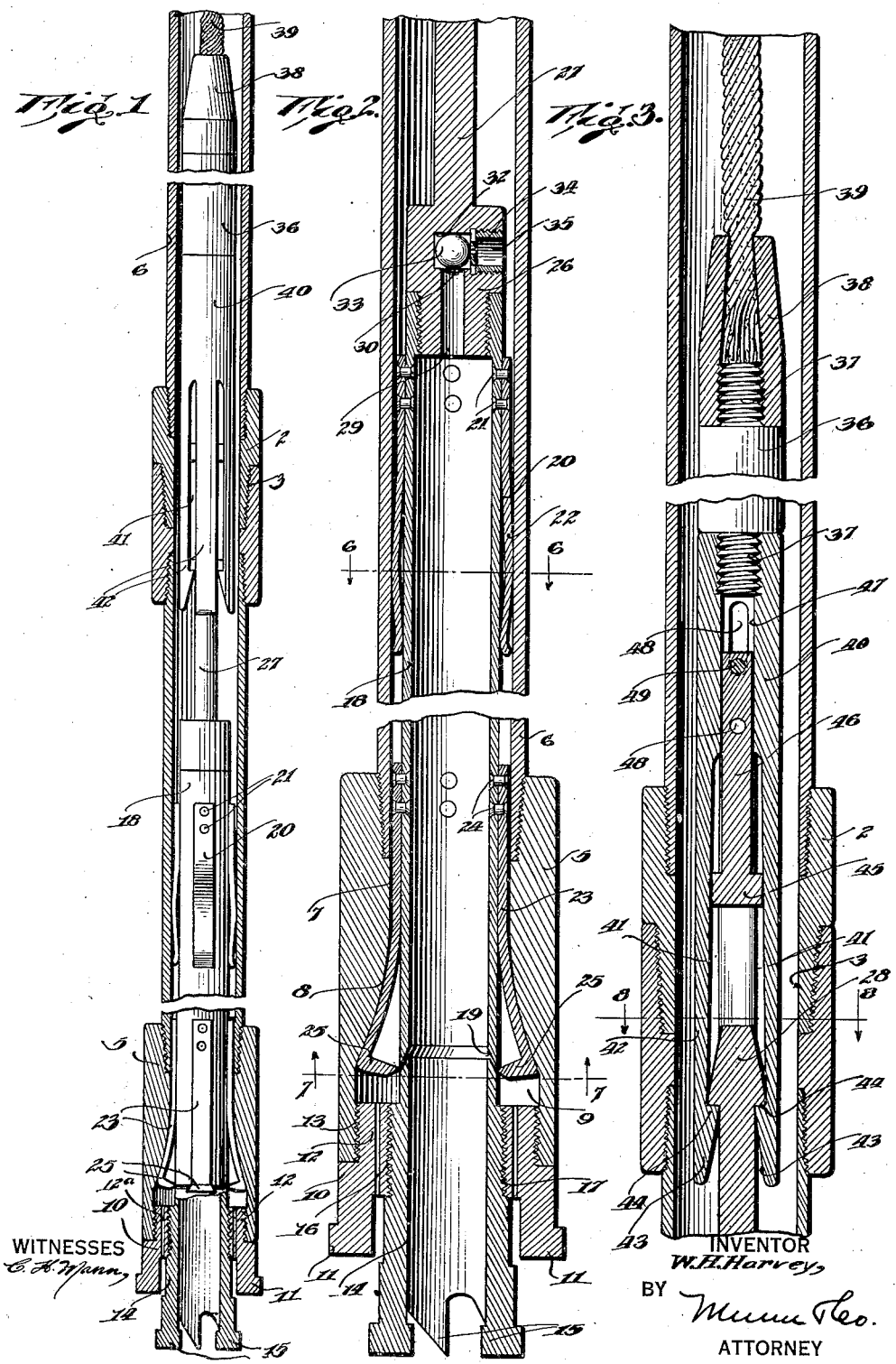
WITNESSES
INVENTOR
W. H. Harvey,
BY
ATTORNEY

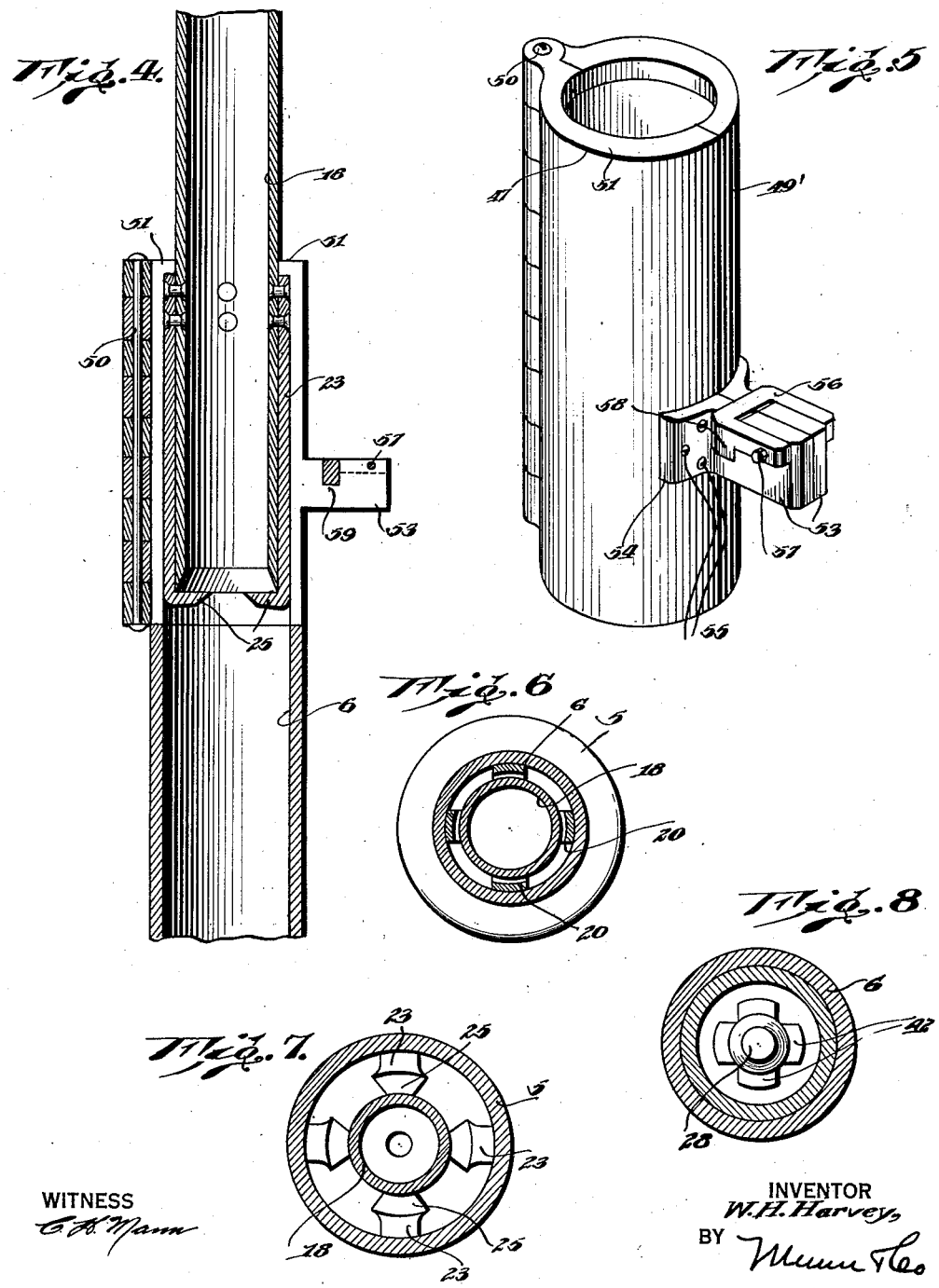

Patented Jan. 27, 1931

1,790,542

UNITED STATES PATENT OFFICE

WILLIAM HENRY HARVEY, OF WATER VALLEY, MISSISSIPPI

CORE DRILL

Application filed March 6, 1929. Serial No. 344,814.

My invention relates to core drills and has as one of its objects the provision of a hollow drill stem in which a core barrel is mounted and is capable of being hoisted through the drill stem to carry the core to the surface.

The invention further provides a drill of this character wherein a core of strata may be lifted from bottom of the well at any particular time. It is another object of the invention to provide a core drill wherein the drilling fluid is prevented from contacting with the core to contaminate the latter.

Still another object of the invention is to provide a core drill embodying a hoist which is adapted to be lowered into the drill stem and automatically couple itself to the core barrel when it is desired to raise the latter to the ground surface.

With the preceding and other objects and advantages in mind the invention consists in the novel combination of elements, arrangements of parts and operations to be hereinafter specifically referred to, claimed and illustrated in the accompanying drawings: wherein Figure 1 is a vertical sectional view of the invention;

Fig. 2 is an enlarged view similar to Fig. 1 and showing the core barrel in longitudinal section;

Fig. 3 is a fragmentary longitudinal sectional view illustrating the core barrel hoist engaged with the core barrel;

Fig. 4 is a fragmentary vertical sectional view illustrating bottom end of the core barrel in elevated position;

Fig. 5 is a perspective of the clamp for association with the core barrel when in elevated position;

Fig. 6 is a horizontal section on line 6—6 of Fig. 2;

Fig. 7 is a similar view on line 7—7 of Fig. 2 and

Fig. 8 is a horizontal section on line 8—8 of Fig. 3.

Referring to the invention in detail a drill collar 5, threadedly received on the lower end of a hollow drill stem 6, is provided. The sections composing the drill stem are connected together by tool joints 2 having parallel inner surfaces and flush external surfaces. The drill collar 5 has its bore 7 flared intermediate its ends as at 8 and opening into a circular cavity 9 at the lower end of the drill collar.

For the purpose of cutting the outside diameter of the well a circular drill bit 10 formed with cutting teeth 11 upon its under face is provided. A circular threaded shank 12 is formed on the upper end of the drill bit and is threadedly attached to the lower end of the drill collar by means of cooperating interior screw threads 13 formed on the walls of the recess 9. Vertically extending bores 12a are provided at spaced intervals in the circular shank thru which drilling fluid is adapted to be discharged.

A cylindrical core drill bit 14 of less diameter than the drill bit 10 and having teeth 15 upon its lower end is provided. The core drill bit 14 passes through a central bore 16 in the drill bit 10 and is attached to the drill bit 10 by cooperating threads 17 provided on the core drill bit and walls of the bore 16 respectively. As disclosed in Fig. 2 the upper end of the core drill bit projects above the circular shank 12 and terminates in a bevelled end 19 which projects into the flared end 8 of the bore 7.

A core barrel 18 removably arranged in the hollow drill stem is provided for cooperation with the core drill bit 14 in forming the core. The barrel 18 has its lower end received within the drill collar 5 and has a bevelled terminal 19 which receives the bevelled end 19 of the core drill bit. To retain the core barrel concentrically within the drill stem a plurality of spring arms 20 extend longitudinally of the core barrel at its upper end and are equi-distantly spaced about the latter. The upper ends of these spring arms are riveted or otherwise secured to the core barrel as at 21 and from a point intermediate their ends to their lower ends these spring arms are longitudinally bowed as indicated at 22 for frictional contact with the interior of the drill stem. For the purpose of retaining the core within the core barrel while the latter is being lifted a plurality of spring arms 23 extend longitudinally of the core barrel at spaced intervals adjacent its lower end and have their upper ends secured to the core barrel by fastenings such as rivets 24. The free ends of the spring arms 23 are curved away from the core barrel and terminate in inwardly directed lugs 25 which normally lie in a position with their inner ends adjacent the bevelled end 19 of the core barrel. In this connection it is pointed out that the flared end 8 of the bore 7 affords clearance for the curved ends of the spring arm 23. In other words the curved ends of the spring arms conform to the contour of the flared end of the bore when the core barrel is in normal position. Upon raising of the core barrel, however, the passage of the spring arms 23 through the bore 7 springs the curved ends of the arms inwardly to cause the lugs 25 to underlie the bevelled end 19 and sustain the core within the barrel.

A cylindrical plug 26 is threaded in the upper end of the core barrel and is formed with an upstanding shank 27 having an enlarged tapered head 28 at its upper end adapted to be engaged by the core barrel hoist to be hereinafter described. The plug 26 is provided with a central longitudinal bore 29 having a ball valve seat 30 at its upper end. A recess 32 is formed in the plug above the bore 29 and communicates with the upper end of the latter. A ball valve 33 is loosely mounted within the recess 32 and is held against displacement by a spider or cage 34 held within the recess 32 by means of a plug 35 threaded in the outer end of this recess. The ball valve functions to permit the escape of air and fluid from the core barrel through the communicating openings 29 and 32 incident to the formation of the core therein. Inasmuch as the ball normally seats upon the seat 30 drilling fluid passing through the drill stem is prevented from flowing into the barrel. Thus the core is maintained in its natural state and free from contamination from the drilling fluid.

For the purpose of lifting the core barrel from the drill stem a core hoist is provided consisting of a sinker bar 36 having reduced threaded ends 37. A wire line connector 38 is threaded on the upper threaded end 37 and held therein is a suspension cable 39 extending to and connected with a suitable hoisting mechanism at surface of ground. A cylindrical member 40 is arranged concentric to the lower end of the sinker bar and has threaded engagement with the lower threaded end 37. The cylindrical member is provided with a plurality of spaced longitudinally extending slots 41 from its lower end to a point intermediate its end which afford a plurality of longitudinally extending circumferentially resilient jaws 42. These jaws 42 have bevelled inner surfaces 43 and right angular shoulders 44 at the upper ends of these bevelled surfaces. Thus when the core hoist is lowered into the drill stem the bevelled surfaces riding over the tapered head 28 will spread the jaws over the head and engage the shoulders 44 beneath the lower end of the head. As disclosed in Fig. 3 it will be observed that the core barrel and hoist are effectively detachably coupled together so that upon hoisting of the cable 39 the core barrel will be hoisted through the drill stem.

For the purpose of disengaging the resilient jaws 42 from the head 28 after the core barrel has been lowered to operative position within the drill stem a circular expanding head 45 is slidably mounted within the jaws and is formed with a circular shank 46, the latter being slidably mounted in a bore 47 in the upper end of the cylinder 40. The expanding head 45 engages a bevelled or tapered inner surface of the members 42 which decrease from their lower end to their upper end. The cylinder 40 is provided with parallel slots 48 at diametrically opposite points along the walls of the bore 47 in which a transverse bolt 49 removably engaged with the shank 46 is movable. Thus when the core barrel and core barrel hoist are lowered into the drill stem and has reached its lowermost position the expanding head 45 will engage the head 28 causing the head 45 to move upwardly whereupon the bevelled surfaces 42 will expand the resilient jaws to disengage the shoulders 44 thereof from the head 28. However, when the core hoist is used to hoist the core barrel the shank 46 is secured against longitudinal movement by a removable transverse fastening 48 passed through the shank and the cylinder 40.

For the purpose of clamping the resilient arms 23 in parallelism against the periphery of the core barrel when the latter has been lifted from the drill stem a clamp is provided consisting of complementary semi-circular sections 49' hingedly connected together as at 50. The upper ends of the members 49' are formed with inwardly directed flanges or shoulders 51 which abut the upper ends of the spring arms when the clamp is in operative position.

As disclosed in Fig. 4 the clamp is applied to the lower end of the core barrel with its lower end resting on the upper end of the drill stem after the core barrel has been lifted. In order to hold the sections 49' of the clamp in position around the core barrel a latch is provided which consists of a pair of parallel outstanding plates 53 having attaching flanges 54 which are attached to the free ends of the sections by fastenings 55. A U-shaped latch element 56 is pivotally connected with the outer ends of the plate 53 by a removable bolt 57 passing through the extremity of the legs of the U-shaped latch element and the plate adjacent their upper edges. Lugs 58 are formed at opposite sides of the U-shaped latch element and are normally engaged in coinciding recesses 59 in the upper edges of the plate.

With the clamp thus assembled with the core barrel the extensions 25 of the spring arm 23 will underlie the core contained in the core barrel and prevent the same from accidentally dropping out of the latter until it is desired to remove the core.

What is claimed is:

1. In combination a drill collar the bore of which is flared at its lower end, a core drill carried by the collar, a core barrel received in the drill collar, a plurality of resilient arms attached to the periphery of the core barrel and extending longitudinally of the same and normally resiliently engaging the walls of the bore of the collar, and an inwardly directed cutting element carried by the lower end of each of the arms so that upon raising of the core barrel the resilient arms will be forced inwardly over the lower end of the core barrel as the arms ride over the walls of the bore.

2. In combination a drill collar whose bore is flared at its lower end, a core barrel removably received in the collar, and a plurality of radially yieldable core severing elements attached to the periphery of the barrel and normally resiliently engaged with the walls of the bore whereby lifting of the core barrel will cause the severing elements to ride over the walls of the bore to force them inwardly to overlie the lower end of the core barrel.

3. In a core drill a drill collar whose bore is tapered at the lower end, a core drill attached to the collar and a core barrel removably received in the collar, a plurality of resilient arms extending longitudinally of the core barrel and having their upper ends attached thereto, the resilient arms being normally urged outwardly so that they will engage the walls of the bore throughout their entire length, a severing lug carried by the free end of each arm so that upon lifting of the core barrel the free ends of the arms will be forced inwardly to cause the lugs to sever the core and underlie the core barrel.

4. In a core drill a hollow drill stem having the lower end of its bore flared, a core barrel removably arranged in the drill stem and having its lower end projecting into the flared end thereof, a plurality of resilient arms extending longitudinally of the periphery of the core drill and having their upper ends attached thereto, a core severing lug carried by the free end of each of the arms, the arms being normally urged in an outward direction and contacting with the interior of the drill stem whereby upon lifting of the core barrel the arms will be forced inwardly so that they will contact with the core barrel throughout their entire length and held in such position during the entire withdrawal operation of the core barrel from the stem.

Signed at Water Valley in the county of Yalobusha and State of Mississippi this 12th day of February, A. D. 1929.

WILLIAM HENRY HARVEY.